United States Patent [19]

McGee

[11] 3,989,783
[45] Nov. 2, 1976

[54] DENSE MULLITE CERAMIC BODIES AND PROCESS OF MANUFACTURE

[75] Inventor: Thomas D. McGee, Ames, Iowa

[73] Assignee: Iowa State University Research Foundation, Inc., Ames, Iowa

[22] Filed: June 2, 1975

[21] Appl. No.: 583,201

Related U.S. Application Data

[63] Continuation-in-part of Ser. No. 374,275, June 27, 1973, abandoned.

[52] U.S. Cl. .............................. 264/56; 106/73.3; 106/73.4; 106/73.5; 264/125
[51] Int. Cl.$^2$ .................. C04B 35/64; C04B 35/10
[58] Field of Search .............. 264/615, 66, 56, 125; 106/65, 73.3, 73.32, 73.4, 73.5

[56] References Cited
OTHER PUBLICATIONS

McGee et al., "Mullitization of Alumino–Siliate Gels," Cer. Bull., vol. 51, No. 7 (1972) pp. 577–581.
Augustinik et al., "Mineralizugushcheye deystvige dvuokisi titana na proters mirtktigotsie v kamennokeramicheskikl mansokh," Izvesltiya vysshilch uchebnykh zavedeniy, vol. XIII, No. 1, 1970 pp. 400–402, Translation supplied.

Primary Examiner—Donald J. Arnold
Assistant Examiner—John Parrish

[57] ABSTRACT

Dense mullite ceramic bodies are manufactured from a mullite-proportioned mixture of alumina ($Al_2O_3$) and silica ($SiO_2$) containing a critically small amount of titania ($TiO_2$). The preferred concentration of titania based on the mullite ($Al_6Si_2O_{13}$) is from 0.5 to 1.0% by weight, which by means of a specific sequence of processing steps results in mullite bodies having densities of 2.5 g./cc. or greater. More specifically, a molecularly intermixed mixture is calcined at a temperature of 900 to 1150° C. to convert the mixture to mullite in intimate association with the small percentage of titania, which is present essentially as fine titania crystals. The calcined mullite is ground to break up the aggregates and obtain a mixture of essentially discrete crystals of mullite and titania. The ground mixture is formed into the shape of the desired bodies, and the bodies are heated at an effective sintering temperature to produce the dense mullite bodies.

6 Claims, No Drawings

DENSE MULLITE CERAMIC BODIES AND PROCESS OF MANUFACTURE

CROSS-REFERENCE

This application is a continuation-in-part of my copending application Serial No. 374,275, filed June 27, 1973, now abandoned.

BACKGROUND

One of the common constituents in ceramic articles made from clays is mullite ($Al_6Si_2O_{13}$). This is produced in the firing process by the breakdown of the clay and growth of needle-like mullite crystals. Mullite has many desirable properties. These include a low coefficient of thermal expansion, high strength, high electronic resistivity, hardness and insolubility in strong acids and bases. In porcelain and china, the development of mullite is responsible for its high strength and hardness. In refractories, mullite contributes thermal shock resistance, high strength, and hot strength. Mullite is a strong, versatile refractory. Its high dielectric breakdown resistance make it an excellent insulator.

Attempts to manufacture mullite from natural materials such as clays and bauxites result in undesirable impurities which come from the natural raw materials. Attempts to manufacture high purity mullite from aluminum oxide and silica are very expensive because the alumina and silica must diffuse together through the mullite which forms at the interface between the two. This diffusion is so slow that repeated heat treatment with grinding between each heat treatment is required. The temperatures must be at least 1600° C. and usually are higher. There is therefore a recognized need for a practical commercial process for preparing high purity mullite. This has not heretofore been met from the general state of knowledge of sintering oxides. (See, for example, Greskovich and Woods, "Fabrication of $ThO_2$-Doped $Y_2O_3$", *Ceramic Bulletin*, Vol. 52, No. 5, pp. 473–378 (1973).

It is known that salts of aluminum and silicon can be mixed in a non-aqueous solution to form a coprecipitate of aluminum and silicon hydroxides on the addition of aqueous ammonium hydroxide. When the aluminum and silicon are present in the chemical ratio to form mullite, the precipitated hydroxide gel can be dehydrated by drying to produce a powder containing molecularly intermixed alumina and silica, which on firing at a high temperature can be converted to mullite. M. O. Marlowe and T. D. McGee, "Analysis of $Fe_2O_3$, $TiO_2$, and $Cr_2O_3$ in Mullite by X-Ray Fluorescense," *Proc. Iowa Acad. Sci.*, 70, 153–60 (1963). The resulting mullite, however, is not suitable for use as a ceramic product, since the mullite is in the form of large, coarse crystals, whereas a dense, integrated body of fine mullite crystals is required for commercially acceptable mullite ceramics.

Further studies on "Mullitization of Alumino-Silicate Gels" were reported by T. D. McGee and C. D. Wirkus, in *The American Ceramics Society Bulletin*, Vol. 51, No. 7, 577–581 (July, 1972). The experiments of that paper had been previously presented by me at the 23rd Pacific Coast Regional Meeting of the American Ceramics Society, San Francisco, California, Oct. 28, 1970. In carrying forward the investigation of my 1963 paper (above cited), it was shown that the molecular scale mixing in non-aqueous solution prior to coprecipitation permits complete conversion of alumino-silicates to high purity mullite at temperatures of around 1150° C. In some of the reported experiments, titanium hydroxide was incorporated in the precipitated gel in amounts corresponding to about 3 to 12% titania by weight based on the resulting mullite-titania ceramic, the $TiO_2$ replacing a corresponding molar amount of $SiO_2$. Crystalline $TiO_2$ was shown to be present at 3% $TiO_2$ or greater, but the increase in cell size at 3% $TiO_2$ as compared with 0% indicated that some of the mullite was in solid solution. The conclusion was therefore reached that "titania has little solid solubility in mullite at 1300° C. and inhibits crystal growth."

The extent of solid solution solubility of titania in mullite had previously been investigated. See G. Gelsdorf and H. Schwiete, *Arch. Eisenhuttenwes.*, 27, 807–811 (1956). Gelsdorf and Schwiete had determined by X-Ray defraction investigation that "1.5% $TiO_2$ at 1450° C. can be incorporated in the mullite lattice," referring to the mechanism of incorporation as "Einlagerung" (intercalation). However, the present invention is based on the discovery that the solid solution solubility of titania in mullite is much lower than 1.5%, and that concentrations of as little as 0.5 to 1% titania can act as an effective grain growth inhibitor for mullite crystals. The invention further includes the development of a specific set of processing steps, involving critical calcining temperatures, whereby integrated, high density mullite bodies can be produced. Final densities in the range of 2.50 to 3.16 grams per cubic centimeter are obtainable. If higher concentrations of titania had been employed, as taught by the prior art, the resulting density of the final product under comparable processing conditions would be higher. Therefore, where the objective is to produce mullite bodies of maximum density, as with the process of the present invention, the use of a critically small portion of titania is therefore essential, but prior to the present invention this was not known to be possible, and, in fact, the state of the art suggested that amounts of titania of 1.5% or less based on the mullite would be ineffective as an inhibitor of mullite grain growth.

DETAILED DESCRIPTION

In practicing the process of the present invention, the starting material is a molecularly intermixed mixture of alumina ($Al_2O_3$) and silica ($SiO_2$) prepared as disclosed in the previously cited publications of Marlowe and McGee, and McGee and Wirkus. For example, aluminum chloride ($AlCl_3$) and silicon chloride ($SiCl_4$) in substantially the stoichiometric proportions to form mullite ($Al_6Si_2O_{13}$), namely, three moles of aluminum per mole of silicon, are dissolved in absolute methanol or other suitable organic solvent. This achieves molecular scale mixing of the aluminum and silicon. On addition of aqueous ammonia ($NH_4OH$) to the methanol solution, aluminum and silicon hydroxides are coprecipitated in the proportions for conversion to mullite. The gel precipitate is dehydrated to produce a molecular scale mixture of alumina and silica, for example, by drying the gel at 150° C. until a free-flowing powder is obtained.

In accordance with the process of the present invention, the starting material, comprising the molecular scale mixture of alumina and silica in the proportions of mullite, should preferably have present therein molecularly intermixed titania ($TiO_2$) in an amount corresponding to 0.50 to 1.0% titania based on the weight of the mullite which can be formed from the mixture. For optimum results the amount of titania should be kept below 1.50% and above 0.25% by weight (mullite basis). The titania can be readily incorporated in the mixture by dissolving an equivalent amount of a titanium salt in the organic solvent solution from which the gel precipitate is formed. For example, titanium chloride ($TiCl_4$) can be dissolved in the absolute methanol in the prescribed proportions, coprecipitated as titanium hydroxide with the aluminum and silicon hydroxides, which are then dried as previously described to produce the dehydrated powder composed of the molecularly mixed alumina, silica, and titania.

The use of such critically small amounts of titania is important to produce a ceramic product from the mullite of maximized density. Within the stated ranges, the bulk density of the final mullite product can be appreciably increased. Two factors are involved. The titania, although present in an amount previously throught to product only a solid solution of titania in mullite, functions to inhibit grain growth of the mullite, while at the same time the titania does not interfere with the integration and consolidation of the mullite during sintering.

During the calcining, the molecular mixture of alumina, silica, and titania is converted to mullite without promoting the growth of large coarse mullite crystals. The calcining temperature is important. More specifically, the mixture, which may be in the form of a dry powder, as previously described, is heated at a temperature within the range from 900° to 1150° C. until substantially all of the alumina and silica have reacted to form fine crystals of mullite. The heating time may range from ½ to 48 hours with a heating time of about 1 to 4 hours usually being sufficient. The most advantageous calcining temperatures appear to be in the range of 950° to 1100° C. For example, calcining at 1050° C. for about 2 hours.

On the completion of the calcining, the fine mullite crystals and the fine titania crystals will be in the form of frangible aggregates of discrete crystals. The size of the individual crystals can be checked by X-Ray diffraction, the size index being in terms of Angstroms as determined by X-Ray line broadening. See Klug and Alexander, X-Ray Diffraction Procedures, Chap. 9, pp. 491–538 (John Wiley & Sons, 1954). In general, the average crystallite size as determined by line broadening X-Ray diffraction measurement should be less than 1500 Angstroms, and typically will be within the range from about 100 to 600 Angstroms. However, since the mullite crystals are elongated, these figures should be regarded as only an index of the desired fineness of the crystallites rather than as representing an exact measurement of crystal size.

Following the calcining, the aggregated mixture of mullite and titanium crystals are subjected to fine grinding to liberate discrete crystals. The grinding is preferably continued until the individual crystals of mullite and titania are substantially liberated, thereby obtaining a mixture of separated fine crystals of each constituent. The required grinding can be carried out in standard grinding apparatus, such as a ball mill. Usually, grinding for at least one-half hour will be desirable, and typically the grinding time in a ball mill may advantageously range from 1 to 10 hours. It will be understood that the state of subdivision can be checked during grinding by microscopic examination. After the aggregates have been broken up to discrete crystals, further grinding is not advantageous.

In producing ceramic products accounding to the process of the present invention, the ground powder is next formed into the shape of the desired ceramic products. Standard forming techniques can be used. For example, the powder can be moistened with water, pressed in a mold to the desired shape, and then sintered. As an aid to forming the powder into the desired shapes, a temporary combustible binder can be used, such as polyvinyl alcohol (PVA). For example, a 5% solution of PVA in water can be used to wet the powder before forming. The amount employed is not critical, but a typical amount would be 10 parts by weight of the 5% aqueous PVA solution per 100 parts of the powder. Where the desired shapes require special forming techniques, such as extrusion, the use of temporary binders will be particularly desirable. For example, the powder may be formed into a thick slurry by admixture with an aqueous solution of a temporary binder, such as PVA, and the slurry extruded to form cylinders or other special shpaes. For solid bodies of relatively simple configuration, the use of a temporary binder or even the use of water is not essential. The powder may be pressed in a mold to a shaperetaining condition, which will permit the formed bodies to be sintered.

In the final step of the process, the formed mullite bodies are heated at an effective sintering temperature to produce integrated dense mullite products. The singering is carried out at temperatures known for this purpose. For example, sintering temperatures of from 1550° to 1650° C. are advantageous. More generally, heating above 1500° C. is necessary but temperatures above 1700° C. are not needed. The heating at the sintering temperatures is preferably continued until the powder has consolidated to a substantially maximum bulk density. The desired maximum density will be in the range of about 2.50 to 3.16 grams per cubic centimeter. Optimally, a density of 2.90 g./cc. or greater is obtained. The required heating time may range from ½ to 10 hours, with time of ½ to 1 hours being typical. The crystalline titania continues to act as an effective grain growth inhibitor for the mullite during the sintering. On completion of sintering, the amount of $TiO_2$ in solid solution will be very small, viz. less than 0.25% based on the mullite.

The process of the present invention is further illustrated by the following specific examples:

EXAMPLE I

One liter of absolute methanol was chilled in an ice bath and 400 cc. of technical grade $SiCl_4$ were added through a buret while stirring vigorously. The solution was stored in a refrigerator in a tightly capped brown bottle. A 25 cc. aliquot was withdrawn, placed in a weighted crucible, and neutralized with aqueous 5% $NH_4OH$ solution. The crucible was covered, dried at 100° C. overnight and calcined at 1000° C. The crucible was again weighed to determine the concentration of the silica in the solution.

One liter of absolute methanol was stirred vigorously while 400 grams of anhydrous $AlCl_3$ were slowly added to produce a transparent solution. This was also stored in a tightly capped brown bottle in a refrigerator. This solution was also standardized by the method used to determine the concentration of the $SiCl_4$.

Five hundred cc. of absolute methanol were cooled in an ice bath and 100 cc. of $TiCl_4$ were added slowly with a buret while stirring vigorously. This solution was stored and standardized in the same manner used for the SiCl₄.

The concentrations were found to be 0.00725 moles Al₂O₃ per cc. AlCl₃ solution, 0.0163 moles SiO₂ per cc. SiCl₄ solution, and 0.0795 grams TiO₂ per cc. of TiCl₄ solution.

Then 200 cc. of SiCl₄ were mixed with 674 cc. of AlCl₄ solution in a 2 liter beaker. Sufficient aqueous 5% NH₄OH was added while stirring to produce a methyl red end point. This produced a gelatinous precipitate which was stirred vigorously to obtain homogeneity. Stirring was continued and heat was applied to drive off the methanol and ammonium chloride. The heating produced a very stiff gelatinous mass which could no longer be stirred easily. The beaker was transferred to an oven at 150° C. overnight. This produced a free flowing white powder which was amorphous by X-Ray diffraction tests.

Additional mixtures of 200 cc. SiCl₄ and 674 cc. AlCl₃ were made to which were added 87.2 and 174.8 cc. of TiCl₄, to produce 1.00% and 2.00% TiO₂ respectively. Each mixture was mixed, precipitated and dehydrated as explained above.

EXAMPLE II

Ten grams of powder from each composition of Example I were heated in porcelain crucibles in a furnace for two hours at temperatures of 850°, 950°,1050°, 1100°, and 1250° C. Each of these was ground with a mechanical mortar and pestle for ½ hour. The powders were moistened with 10% distilled water and pressed into ¼ inch diameter by ¼ inch high pellets with an hydraulic press using 5000 PSI pressure. The pellets were fired at 1650° C. in a gas fired furnace, heating in 7 hours and holding maximum temperature for ½ hours.

After firing the bulk density was determined by the Archimedes displacement method using water as the buoyant medium. The bulk densities, in grams per cc. are shown below:

| Calcining temperature | 0 % TiO₂ | 1 % TiO₂ | 2 % TiO₂ |
|---|---|---|---|
| 850° C. | 2.55 | 2.94 | 2.82 |
| 950° C. | 2.41 | 3.08 | 2.71 |
| 1050° C. | 2.32 | 2.86 | 2.74 |
| 1100° C. | 2.38 | 3.03 | 2.75 |
| 1150° C. | 2.16 | 2.61 | 2.45 |
| 1250° C. | 2.15 | 2.51 | 2.43 |

From the table it can be seen that a titania content of 1% consistently gave somewhat higher bulk densities than the 2% level, and much higher densities than 0% TiO₂. This shows that amounts of titania as high as 2% are not necessary to inhibit mullite grain growth; and, in fact, are less desirable than smaller amounts of titania. The calcining temperature range of 950° to 1100° C. is indicated as the most desirable for maximizing the density.

Specimens were mounted in bakelite. One surface was ground flat with 600 grit silicon carbide paper, polished with 6 micron and 1 micron diamond paste and with 0.3 micron alpha alumina. Half of the polished surface was etched with 10% hydrofluoric acid. Both the polished and the etched areas were photographed when magnified 128 times with a light microscope.

The specimens containing 0% TiO₂ consisted of a mixture of large and small grains. For 1650° C. firing of the 1100° C. calcined specimens, these grains were about 40 microns and about 3 microns respectively. The large grains were poorly bonded to the small ones and tended to pull out during preparation for microscopic examination. The specimens containing 1% TiO₂ had much more uniform grains which did not tend to pull out and were all of the smaller size. The specimens calcined at 950° C. and fired at 1650° C. contained only small isolated pores at the grain junctions. Etching revealed randomly oriented needle-like mullite crystals with about 10:1 length to width ratio with some needles 40 microns long.

I claim:
1. The process for converting a molecularly intermixed mixture of alumina (Al₂O₃) and silica (SiO₂) to dense mullite bodies, said mixture having been formed by precipitating a gel composed essentially of aluminum and silicon hydroxides in substantially stoichiometric proportions to form mullite (Al₆Si₂O₁₃), and dehydrating said gel to obtain said mixture, comprising:
   a. having present in said mixture an amount of molecularly intermixed titania (TiO₂) of at least 0.25% but below 1.50% titania based on the weight of the mullite which can be formed therefrom;
   b. calcining said mixture at a temperature within the range from 900° to 1150° C. to convert said mixture to mullite in intimate association with titania, said calcined mullite being in the form of frangible aggregates of titania crystals and mullite crystals having an average crystalline size as determined by line broadening X-Ray diffraction measurement of less than 1500 Angstroms;
   c. grinding the calcined mixture until said aggregates are broken up and there is obtained a mixture of separated crystals of mullite and titania;
   d. forming the ground mixture into the shape of the desired mullite bodies; and
   e. heating said formed mullite bodies at an effective sintering temperature within the range from 1500° to 1700° C. to integrate said bodies, said heating at said effective sintering temperature being continued until said bodies have a density of at least 2.50 grams per cubic centimeter.

2. The process of claim 1 wherein said molecularly intermixed mixture contains said titania in an amount corresponding to 0.5 to 1.0% based on the weight of the mullite which can be formed therefrom.

3. The process of claim 1 in which said mixture is calcined at a temperature of from 950° to 1125° C.

4. The process of claim 1 in which said formed mixture is sintered at a temperature of from 1550° to 1650° C.

5. The process for converting a molecularly intermixed mixture of alumina (Al₂O₃) and silica (SiO₂) to dense mullite bodies, said mixture having been formed by precipitating a gel composed essentially of aluminum and silicon hydroxides in substantially stoichiometric proportions to form mullite (Al₆Si₂O₁₃), and dehydrating said gel to obtain said mixture, comprising:
   a. having present in said mixture an amount of molecularly intermixed titania (TiO₂) corresponding to 0.5 to 1.0% titania based on the weight of the mullite which can be formed therefrom;
   b. calcining said mixture at a temperature within the range from 950° to 1125° C. to convert said mixture to mullite in intimate association with said titania, said calcined mullite being in the form of frangible aggregates of titania crystals and mullite crystals having an average crystalline size as determined by line broadening X-Ray diffraction measurements of about 100 to 600 Angstroms;

c. grinding the calcined mixture until said aggregates are broken up and there is obtained a mixture of separated crystals of mullite and titania;

d. forming the ground mixture into the shape of the desired mullite bodies; and e. sintering said formed mixture at a temperature within the range from about 1550° to 1650° C. to produce integrated mullite bodies, said heating being continued until said bodies have a maximized density above 2.50 grams per cubic centimeter.

6. The process of claim 5 in which said sintering is continued until the resulting mullite bodies have a density of at least 2.90 grams per cubic centimeter.

* * * * *